Patented Mar. 10, 1953

2,631,151

UNITED STATES PATENT OFFICE 2,631,151

PERFLUORO N-ALKYL PIPERIDINES

Edward A. Kauck, St. Paul, Minn., and Joseph H. Simons, State College, Pa., assignors to Minnesota Mining & Manufacturing Company, St. Paul, Minn., a corporation of Delaware No Drawing. Original application May 12, 1950, Serial No. 161,717. Divided and this application May 21, 1952, Serial No. 290,316

2 Claims. (Cl. 260—293)

This application is a division of Ser. No. 161,717, filed on May 12, 1950 as a continuation-in-part of our application Ser. No. 29,955, filed on May 28, 1948 (now abandoned).

The present divisional application claims heterocyclic fluorocarbon tertiary amines of the fully fluorinated N-alkylpiperidine class.

This invention in its broad aspects relates to our discovery of a new and useful class of fluorinated carbon compounds, namely, the saturated fluorocarbon tertiary amines. In these novel compounds the molecules contain only carbon, fluorine and nitrogen atoms and each nitrogen atom is directly bonded to three carbon atoms.

These compounds constitute the family of fully fluorinated analogues of the family of saturated hydrocarbon tertiary amines, the carbon-nitrogen skeletal structure being the same but all hydrogen atoms being replaced by fluorine atoms. These compounds are termed fluorocarbon "amines" merely as a matter of expediency in order to conform with commonly used nomenclature practice. The tertiary amines of conventional organic chemistry are regarded as derived from ammonia, $NH_3$, by replacement of the three hydrogen atoms by three hydrocarbon radicals. The present compounds may be correspondingly regarded as derived from nitrogen trifluoride, $NF_3$, by replacement of the three fluorine atoms by three fluorocarbon radicals. The present compounds have physical and chemical properties which are entirely different from those of the corresponding hydrocarbon tertiary amines, as will be indicated in more detail hereafter. They are members of a disparate class of tertiary "amine" compounds which is sui generis.

The present family of compounds embraces cyclic as well as non-cyclic compounds, and polyamines as well as monoamines, all of which have their structural analogues in the hydrocarbon system of tertiary amines. It is our discovery that the electrochemical process which we employ is a general process capable of producing the fully fluorinated analogues of all of the saturated hydrocarbon tertiary amines, as distinguished from special processes capable of preparing particular species or types of compounds only.

We have found that the compounds of the present class can be directly made from the corresponding hydrocarbon amine compounds as starting materials by employing the novel electrochemical process broadly described and claimed in the copending application of one of us, J. H. Simons, Ser. No. 62,496, filed November 29, 1948 (which replaced Ser. No. 677,407, filed June 17, 1946, and since abandoned), now Patent No. 2,519,983 issued on Aug. 22, 1950. This process involves electrolyzing a solution of liquid hydrogen fluoride containing the organic starting material, and is described in more detail hereafter.

Those compounds which contain five or more carbon atoms in the molecule have boiling points above room temperature and hence are normally non-gaseous. Compounds containing eight or more carbon atoms have boiling points near to or above that of water and may be referred to as high-boiling compounds.

These fluorocarbon tertiary amine compounds are water-insoluble; they have a high degree of chemical inertness; they are non-flammable; and they can be heated to moderately elevated temperatures in "Pyrex" laboratory type glassware without reacting or decomposing. They do not react with metallic sodium or potassium at room temperatures. Making comparisons with non-fluorine compounds on the basis of molecular weights, these new compounds have exceptionally low boiling points, low refractive indices, low viscosities and low surface tensions. They are colorless and are apparently odorless when in pure form.

These compounds have properties which permit of use for many of the purposes for which saturated fluorocarbons can be used. They can be employed as refrigerants, inert diluents for chemical reactions, solvents, hydraulic mechanism fluids, heat transfer media, turbine impellants, transformer liquids, dielectrics, and lubricants. They can also be used as intermediates in the manufacture of other compounds.

Various illustrative sub-classes of our novel compounds will now be indicated and exemplary compounds will be mentioned, following which a number of experimental examples will be set forth to illustrate the general utility of the process and to provide detailed data on various of the compounds.

The saturated aliphatic trifluorocarbon monoamines (containing a single nitrogen atom) are derivable from the corresponding trialkyl amines, and have the same structure except that the hydrogen atoms have been entirely replaced by fluorine atoms. The nitrogen atom of the molecule is directly bonded to each of three saturated aliphatic fluorocarbon groups. These compounds have the formula:

$$R'R''R'''N$$

where the R's represent saturated aliphatic fluorocarbon groups which may be the same or different, having the generic formula: —$C_nF_{2n+1}$. A fluorocarbon group which contains three or more carbon atoms may be present either as a "normal" (straight chain) group or as an isomeric group having a branched structure.

The simplest illustration of these compounds is provided by tri-trifluoromethyl amine, having the structural formula:

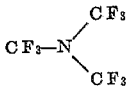

The following table shows how the boiling points of these compounds vary with the number of carbon atoms, and has been simplified by including only the normal (straight chain) compounds wherein the three fluorocarbon groups are the same. Boiling points at 760 mm. pressure are given. These listed compounds are all fluid (gaseous or liquid) at room temperature.

| Compounds | B. P. (°C.) |
|---|---|
| $(CF_3)_3N$ | −11 |
| $(C_2F_5)_3N$ | 70 |
| $(C_3F_7)_3N$ | 130 |
| $(C_4F_9)_3N$ | 178 |
| $(C_5F_{11})_3N$ | 218 |
| $(C_6F_{13})_3N$ | 258 |
| $(C_7F_{15})_3N$ | 294 |
| $(C_8F_{17})_3N$ | 321 |

It will be noted that these boiling points are substantially lower than those of the corresponding compounds of the hydrocarbon trialkyl amine series (despite the fact that the molecular weights are much higher). Thus the B. P. of $(C_2F_5)_3N$ is 70° C. as compared with 89° C. for $(C_2H_5)_3N$. The B. P. of $(C_6F_{13})_3N$ is 258° C. as compared with 300° C. for $(C_6H_{13})_3N$.

The boiling points of these compounds are higher than those of the saturated aliphatic fluorocarbons having the same number of carbon atoms, as is illustrated by the fact that the B. P. of normal $C_6F_{14}$ is about 55° C. as compared to 70° C. for $(C_2F_5)_3N$.

Unsymmetrical as well as symmetrical compounds are included. The lack of symmetry may arise from different numbers of carbon atoms in the fluorocarbon groups, as in the case of $(CF_3)_2N(C_5F_{11})$. Another type of non-symmetry exists when the groups differ as to branching, as when one group is branched and the others are normal straight chains. Both types of non-symmetry may be present, as in the case of $(CF_3)_2N(iso—C_5F_{11})$.

Unlike the trialkyl amines, even the lowest trifluorocarbon amines are not only water-insoluble but do not react with, and are not soluble in, the mineral acids. They are not miscible with the trialkyl amines. They separate out when mixed with liquid hydrogen fluoride, although the trialkyl amines are highly soluble in the latter.

Tests made both at room temperature and at the temperature of boiling water (100° C.) indicate that these compounds do not react with any of the following: concentrated HCl, concentrated $H_2SO_4$, concentrated NaOH, 30% $H_2O_2$, $HNO_2$, and methyl iodide.

The invention is not limited to the aliphatic series of compounds. The nitrogen-bonded saturated carbon-chain groups need not be of the open-chain type; since one, two or all three may be alicyclic, containing a saturated fluorocarbon ring (closed chain). Examples of such compounds are $(C_6F_{11}CF_2)_3N$, corresponding to tricyclohexylmethylamine; $(C_6F_{11}CF_2CF_2)_3N$, corresponding to tricyclohexylethylamine;

$$(CF_3)_2NC_6F_{11}$$

corresponding to dimethylcyclohexylamine;

$$(C_6F_{11})_2NCF_3$$

corresponding to dicyclohexylmethylamine; and $(C_6F_{11})_3N$, corresponding to tricyclohexylamine.

The nitrogen atom can be in a ring (which may be regarded as formed by the closure of two nitrogen-bonded fluorocarbon chains), as illustrated by the fully fluorinated N-alkylpiperidines claimed in the present application, such as $C_5F_{10}NCF_3$, corresponding to N-methylpiperidine, and $C_5F_{10}NC_2F_5$, corresponding to N-ethylpiperidine, etc., wherein $C_5F_{10}N$ is a fluoropiperidine group. A further illustration is $C_5F_{10}NC_6F_{11}$, corresponding to N-cyclohexylpiperidine. The previously mentioned electrochemical process is adapted to the production of such cyclic compounds from the corresponding hydrocarbon amine compounds, the hydrogen atoms being replaced by fluorine atoms.

The electrochemical process produces as by-products various fragmentation products containing fewer carbon atoms than the parent compound, due to cleavage of carbon-nitrogen and even carbon-carbon bonds in the case of some molecules.

Another type of by-product consists of fluorocarbon tertiary amine compounds which contain a greater number of carbon atoms and which have higher boiling points than the fluorocarbon tertiary amine which corresponds to the starting compound. These are presumably formed by the combining of free radicals in the electrolyte solution. These high-boilers range from free-flowing liquids up through viscous oily liquids, greases, tacky solids, and brittle resinous solids.

Electrochemical method of making

As previously stated, the compounds of this invention can be conveniently made by electrolyzing solutions of the corresponding hydrocarbon amine compounds in liquid hydrogen fluoride, the end result of which is to replace hydrogen atoms with fluorine atoms. The formation of by-products has been discussed above. It is not essential to use a hydrocarbon amine (containing only hydrogen atoms to be replaced by fluorine atoms) as equivalent tertiary amines can be employed which contain one or more other carbon-bonded atoms or groups which are replaceable by fluorine atoms in the operation of the process. Thus an amine having one or more carbon-bonded hydroxyl groups (—OH) can be used, as illustrated by triethanolamine, in which case the hydroxyl groups as well as the carbon-bonded hydrogen atoms will be replaced by fluorine atoms. Unsaturated and aromatic amine starting compounds can be employed, which have the same carbon-nitrogen skeleton structures as the desired saturated end products, saturation resulting from fluorine addition in the operation of the process.

A simple type of electrolytic cell can be used, employing a nickel anode and an iron or steel cathode, for example. An iron or steel container can be used, which may be employed as a cathode, with a cover of iron or steel which is bolted in place. Anode and cathode plates, in closelyspaced alternating array, can be suspended from the cover. A suitable gasket material, and insulating material for electrode mountings and leads, is "Teflon" (polytetrafluoroethylene). An upper outlet for gaseous products, an upper inlet for charging materials, and a bottom outlet for liquid products, may be provided. The cell may be provided with a cooling jacket for maintaining a desired operating temperature.

Commercial anhydrous liquid hydrogen fluoride can be used. This normally contains a trace of water, but water need not be present and highly anhydrous hydrogen fluoride can be used. Additional water can be present, but more than a few percent will seriously reduce the operating efficiency. The amine starting compounds are soluble in this material.

A cell potential of about 4 to 8 volts D. C. has been found suitable. A current density of about 20 amperes per square foot of anode surface can be obtained. Voltages sufficiently high to result in the formation of free fluorine are avoided. The process does not depend upon the generation of free fluorine and the latter, if produced, would result in explosions, electrode corrosion, and undesirable reactions.

The preferred operating pressure is atmospheric pressure or a moderately elevated pressure, and the preferred operating temperature range is about 0 to 20° C.; but higher and lower operating pressures and temperatures can be employed.

Liquid fluorinated amine product compounds separate as a constituent of a liquid which is immiscible with the electrolyte and settles to the bottom of the cell from which it can be withdrawn. The latter can be washed with a base and with dilute sulfuric acid, and fractionally distilled to yield the desired fully fluorinated amine product. The desired fully fluorinated amine product can be further purified by refluxing with 25% NaOH solution for a period of several hours. This effectively eliminates any hydrogen-containing by-product contaminants.

*Example*

40 grams of N-methylpiperidine was dissolved in 2000 grams of commercial anhydrous liquid hydrogen fluoride and electrolyzed in the manner previously described. During the 50 hour run additional amounts of the organic compound (totalling 110 grams) were added in order to maintain the concentration. The liquid cell drainings (216 grams) were washed with aqueous base and fractionally distilled to yield a 197 gram fraction of relatively pure $C_5F_{10}NCF_3$, N-trifluoromethyldecafluoropiperidine, having the following properties:

Boiling point (at 730 mm.) _____ 65.0–65.5° C.
Refractive index (at 24° C.) _____ 1.275
Density (grams/cc. at 24° C.) _____ 1.760
Molecular weight (found) _____ 336
Molecular weight (calc.) _____ 333

This compound has the following structural formula:

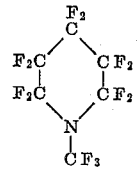

Having described various embodiments of the invention, for purposes of illustration rather than limitation, what we claim is as follows:

1. Saturated fluorocarbon tertiary monoamines of the fully fluorinated N-alkylpiperidine class, having the formula:

$$C_5F_{10}NR$$

where R represents a saturated aliphatic fluorocarbon group.

2. The new and useful compound N-trifluoromethyldecafluoropiperidine, having the formula: $C_5F_{10}NCF_3$.

EDWARD A. KAUCK.
JOSEPH H. SIMONS.

REFERENCES CITED

The following references are of record in the file of this patent:

UNITED STATES PATENTS

| Number | Name | Date |
|---|---|---|
| 2,490,098 | Simons | Dec. 6, 1949 |